United States Patent Office 3,394,301
Patented July 23, 1968

3,394,301
METHOD AND APPARATUS FOR DETERMINING COMPOSITION AND PRESSURE OF A GAS AT LOW PRESSURE
Antonius Gerardus Johannes van Oostrom, Emmasingel, Eindhoven, Netherlands, assignor to North American Philips Company, Inc., New York, N.Y., a corporation of Delaware
Filed July 2, 1965, Ser. No. 469,227
Claims priority, application Netherlands, July 15, 1964, 6408045
6 Claims. (Cl. 324—33)

ABSTRACT OF THE DISCLOSURE

A method and apparatus for determining the composition and pressure of a gas at low pressure is disclosed in which a gas adsorbed on a tip of a monocrystalline tungsten wire is desorbed by applying to the tip a pulsed desorbing field having a field intensity of about 1 to 5 volts/Angstrom, and between pulses the degree of coverage is determined from the electron field emission characteristic curve by work functions from which the initial pressure is inferred.

---

Figure 1:
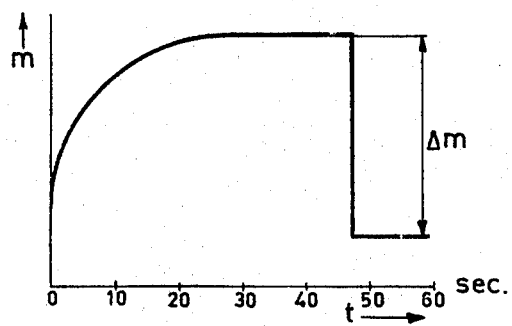

The invention relates to a method of determining the identity and/or the pressure of the constituents of a gas mixture of very low pressure, in which consecutively adsorption and desorption of the gas to be examined is carried out. The invention furthermore relates to a device suitable for carrying out said method.

A known method of determining the pressure and the composition of a gas of low pressure is carried out by causing the gas to be first adsorbed by a clean metal wire, for example of tungsten or rhodium, after which the wire is heated at a given rate from room temperature to about 1800° C. within a period of time of about 1 minute, so that all gas adsorbed is desorbed, while simultaneously pumping is preformed in the measuring system. The variation of the pressure as a function of time and hence as a function of the wire temperature in this thermal desorption is a measure for the identity and the pressure of the constituents initially found in the adsorbed gas. The desorption temperature is characteristic of a gas, since any gas in conjunction with a given metal has its own adsorption energy, so that the temperature of desorption and hence the instant of the heating cycle at which desorption takes place indicates the identity of the desorbed gas. The value of the pressure peaks is a measure for the covering of the wire and hence for the initial pressure of the constituent concerned.

However, this method has a few drawbacks. With pressure of less than $10^{-8}$ torr the time required for adsorption is very long, i.e. many minutes, so that it is difficult to carry out measurements in systems with rapidly varying pressures. Moreover, more than one desorption peak is found for each gas at different temperatures, since the wire is polycrystalline and each crystal face determines a different adsorption energy for a gas. In addition, the fairly great quantity of gas adsorbed at the wire has an influence on the pressure variation in small systems, whilst due to the high temperature of the wire decomposition at the wire may occur.

The invention has for its object to provide a method which has advantages as compared with the known method.

In a method of determining the identity and/or the pressure of the constituents of a gas mixture of very low pressure, in which consecutively adsorption and desorption of the gas to be examined is carried out, the gas is adsorbed, in accordance with the invention, at a tip etched on a monocrystal tungsten wire, having a radius of curvature of about $10^{-5}$ cm., to which tip is subsequently applied a pulsatorily increasing desorption field of an intensity of about 1 to 5 volts/Angstrom, while in between said desorption pulses the electron field emission characteristic curve of the tip determines the work function and hence degree of covering and the initial pressure.

The desorption field intensity is characteristic of a given combination of gas and metal, as is the case with the desorption temperature, so that the variation or the non-variation of the electron field emission, subsequent to the application of a given field intensity at constant temperature, is indicative of the pressure or absence of a given constituent of the adsorbed gas mixture. The determination of the degree of gas covering the tip and hence of the initial pressure can be carried out only electronically in an apparatus recording the Fowler-Nordheim derived relation which reads:

$$i = 1.54 \times 10^{-6} \frac{\beta^2 V^2 A}{\phi t^2(y)} \exp{-6.83 \times 10^7 \frac{\phi^{3/2}}{\beta V} f(y)}$$

where $i$ is the current in amperes, $V$ is the potential difference between the tip and anode in valts, $\beta$ is a geometrical factor determined by the radius and shape of the tip and the distance between the tip and other electrodes in cm.$^{-1}$, $A$ is the emitting surface area in cm.$^2$, $\phi$ is the work function in ev., $f(y)$ is an elliptic function, and $t(y)$ an elliptic function. The slope of log $i/V^2$ vs. $10^4/V$ is called $m$ and is proportional to $\phi^{3/2}/\beta$, $i$ being the current in amperes, $v$ the applied potential in volts, $\phi$ the work function in electron volts, $\beta$ a geometrical factor in cm.$^{-1}$, and $v(y)$, $t(y)$ elliptic functions determined by the image force. The slope of the Fowler-Nordheim plot log $i/v^2$ vs. $10^4/v$ is called $m$ and is proportional to $\phi^{3/2}/\beta$. Therefrom can be inferred the degree of the surface covering and hence the initial pressure.

It is simpler to measure log $i$ against $1/v$ from which $\phi$ can also be derived. According to the invention the duration of each of the desorption pulses and also of the intermediate determinations of the electron field emission may be about 1 second, so that the measurement may be carried out in less than one minute. The time required for adsorption, at a pressure of more than $10^{-11}$ torr, is hardly more than one minute.

The advantage of the method according to the invention is that only a small quantity of gas is adsorbed and desorbed at the extremely small tip, so that also the pressure in small non-pumped systems is not affected. The tip may also be cooled down to the temperature of liquid air in order to reduce migration across the tip. This also permits of measuring rare gases.

The counter-electrode of the tip is preferably formed by a plate having a small aperture, and only the beam emanating from part of the surface of the tip is passed through the aperture, so that only this electron beam is measured, it being thus ensured that different orientations at the tip have no influence.

In order to avoid difficulties arising when at pressures of about $10^{-8}$ torr more than one layer of gas atoms is adsorbed at the tip, the examination may be carried out in accordance with the invention at differently orientated crystal faces of the tip by means of a magnetic field of the order of a few tens of Gauss near the tip.

Figure 2:
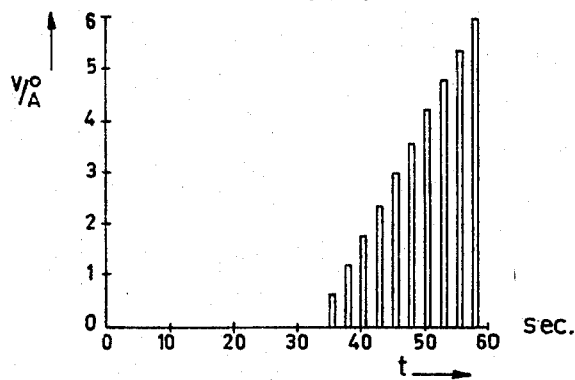
Figure 3:
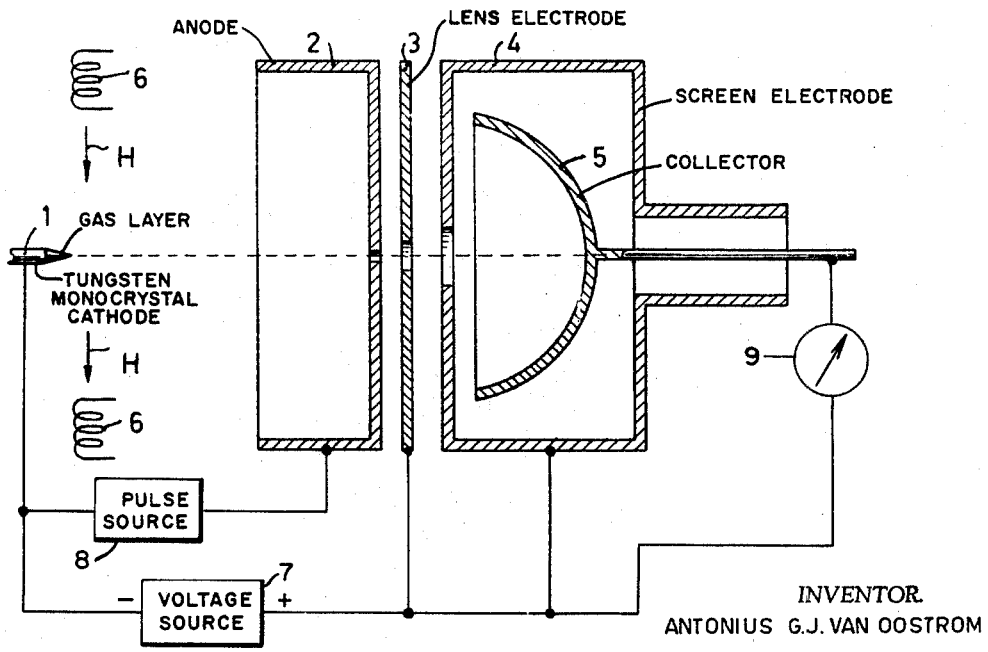

The invention will be described more fully with reference to the drawing, in which FIGS. 1 and 2 show two graphs relating to the method according to the invention and FIG. 3 shows diagrammatically an arrangement suitable for carrying out the method according to the invention.

FIG. 1 illustrates how the slope $m$ of the Fowler-Nordheim relation as a function of time varies, during which time a gas is allowed to adsorb at a given surface. The variation $\Delta m$ indicates to what extent $m$ varies, when at the instant concerned a desorption field intensity sufficient for desorbing all the adsorbed gas is applied. FIG. 2 shows as a function of time the desorption pulses applied in a device according to the invention. Between the desorption pulses the slope $m$ of the Fowler-Nordheim relation is measured. If the latter varies, gas has desorbed.

Referring to FIG. 3, reference numeral 1 designates the tip of a tungsten wire having a radius of curvature at the end of $5 \times 10^{-6}$ cm.; 2 designates the counter-electrode or anode which is negative relative to the tip during the desorption pulses. The electrodes 3, 4 and 5 are, in order of succession, a concentration or lens electrode, a screening shield electrode and a collecting electrode for the electrons in determining the electron field emission characteristic, while the electrodes are positive relative to the tip, by voltage source 7. Reference numeral 6 designates two coils for producing a magnetic field in the vicinity of the tip, in order to permit examination of differently orientated crystal faces. The desorption voltages from pulse source 8 amount from 3 to 15 kv. with a distance between the tip and the counter-electrode of about 10 cms. The emission current is recorded by appropriate means, schematically shown at 9.

What is claimed is:

1. A method of determining the identity and pressure of constituents of a gas mixture at a very low pressure comprising adsorbing a layer gas on the surface of a point electrode of emissive material, applying to the electrode a pulsed desorption field having a field intensity of about 1 to 5 volts/Angstrom, and measuring the field emission from said electrode to obtain a field emission characteristic curve by the work function thereof and determine the extent of gas covering the electrode surface whereby the initial pressure of the gas can be obtained.

2. A method as claimed in claim 1 in which the point electrode is monocrystalline tungsten having a tip whose radius of curvature is about $10^{-5}$ cm.

3. A method as claimed in claim 2 in which the pulses of the desorption field and the intervals therebetween have a duration of about 1 second.

4. A method as claimed in claim 2 in which between pulses a plot log $i/v^2$ vs. $10^4/v$ is obtained, the slope of which is electronically recorded.

5. A method as claimed in claim 3 in which the pulsed desorption field is a magnetic field which in the vicinity of the point electrode is of the order of tens of Gauss.

6. A device for determining the identity and/or pressure of constituents of a gas mixture comprising a point electrode of emissive material having adsorbed thereon a layer of gas, a plate-shaped anode spaced from said point electrode and having an aperture therein, a collector electrode spaced from the anode and remote from the point electrode, a lens electrode between the anode and collector electrode, means to apply a positive potential to each of the anodes, lens and collector electrodes relative to the point electrode, and means to apply a pulsed desorption field between the point electrode and the anode whereby between pulses an electron field emission characteristic curve by the work function is obtained from which the initial pressure can be determined.

References Cited

UNITED STATES PATENTS

| | | | |
|---|---|---|---|
| 3,139,746 | 7/1964 | Noller | 324—33 X |
| 3,321,701 | 5/1967 | Crowell | 324—33 |

OTHER REFERENCES

A. van Oostrom, "Field Emission Cathodes," Journal of Applied Physics, October 1962, volume 33, No. 10, pp. 2917–2922.

RUDOLPH V. ROLINEC, *Primary Examiner.*

C. F. ROBERTS, *Assistant Examiner.*